April 7, 1970 HISASHI KANEKO 3,505,478

CLOCK FREQUENCY CONVERTER FOR TIME DIVISION MULTIPLEXED PULSE COMMUNICATION SYSTEM

Filed April 11, 1967

INVENTOR.
HISASHI KANEKO

BY

Hopgood & Calimafde

ATTORNEYS

United States Patent Office
3,505,478
Patented Apr. 7, 1970

3,505,478

CLOCK FREQUENCY CONVERTER FOR TIME DIVISION MULTIPLEXED PULSE COMMUNICATION SYSTEM

Hisashi Kaneko, Minato-ku, Tokyo, Japan, assignor to Nippon Electric Company, Limited, Tokyo, Japan, a corporation of Japan Filed Apr. 11, 1967, Ser. No. 635,292
Claims priority, application Japan, Apr. 13, 1966, 41/23,464
Int. Cl. H04j 3/06
U.S. Cl. 179—15 6 Claims

ABSTRACT OF THE DISCLOSURE

A system for converting the clock frequencies between two time division communication systems having a delay means with a plurality of tappings serving as a buffer store for conversion of clock frequency of an input pulse signal. Switch means associated with the tappings for deriving an output pulse signal steps from one of the tappings to a next one every time the phase difference between the input clock pulse component and a desired output clock pulse reaches a predetermined value, so that the phase difference may be reduced. Another delay means providing delay time shorter than the input clock pulse repetition period and its associated switch are inserted in the output circuit of the switching means.

Figure 1:
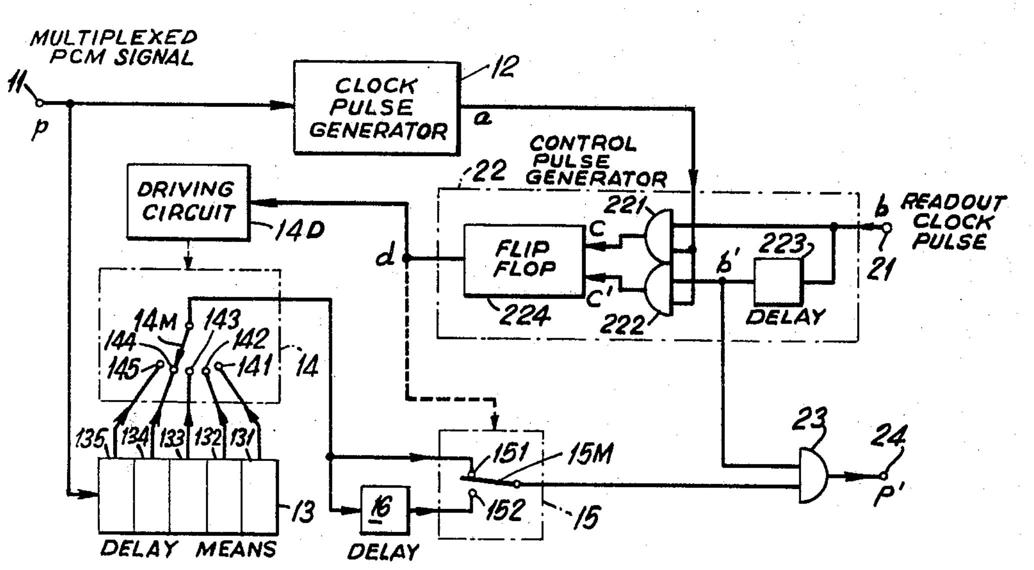

This invention relates to a clock frequency converter for a time division multiplexed communication system and, more particularly, to a clock frequency converter for converting the clock frequencies between two time division multiplexed pulse communication systems having different clock frequencies.

When a time division multiplexed pulse network is installed over a wide range, it is desirable to make the clock frequency or bit frequency of a communication system different from that of the other communication system in order to raise the efficiency of the network. For example, when a time division multiplexed communication system is installed as a main line extending from a local area of the wide range to another local area, the clock frequency of the main line is preferably chosen to be higher than that of a local communication system covering the local area.

One example of the conventional device hitherto proposed as means for combining two communication systems having the different clock frequencies, is that described in U.S. Patent 3,136,861, issued to J. S. Mayo, in which the input time division multiplexed pulse signal is written in a buffer memory and then the written-in signal is read out in response to the clock signal having frequency different from that of the input signal. This device is necessarily complex.

Therefore, an object of the present invention is to provide a simple construction capable of performing the accurate clock frequency conversion.

Briefly, the present invention comprises a delay means having a plurality of register stages to sequentially store the input pulse signal and a rotary switch selectively connected to one of the register stages for sequentially deriving the stored input signal. The rotary switch is stepped every time the phase difference, which is observed between an input clock pulse having the repetition frequency identical to that of the input pulse signal and an output clock pulse for reading out, exceeds a predetermined value. In so doing, the phase difference between the input clock pulse and the output clock pulse, is reduced. In other words, the difference of the repetition frequencies may be canceled by the stepwise motion of the rotary switch performed whenever the difference exceeds an allowable range.

In the above-mentioned convertional device, as well as in my invention described in Japanese Patent Publication No. 11,138/1965, the combination of the shift register and the adder circuit are used as means for detecting the frame synchronization signal contained in the input PCM signal. Therefore, when the present invention is applied to the conventional device, the inherently contained shift register can be utilized as the delay means of the present invention. In this respect, the present invention makes it possible to further simplify the device depending on the structure thereof to which the invention is applicable.

Figure 2:
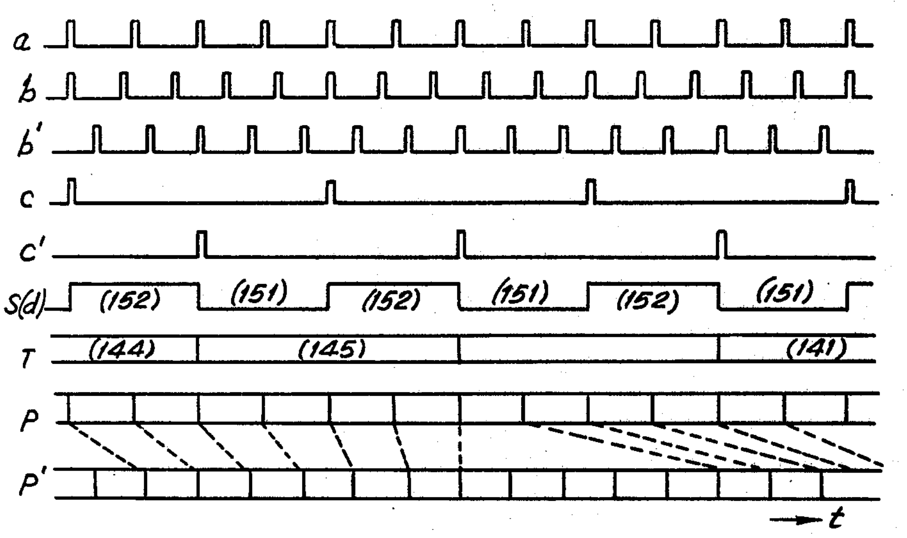

The above-mentioned and other features of this invention will become more apparent and the invention itself will best be understood by reference to the following description of embodiments of the invention taken in conjunction with the accompanying drawing, wherein:

FIG. 1 is a circuit diagram, shown partly in block form, of an embodiment of the present invention; and FIG. 2 shows a group of waveforms for illustrating the performance of the embodiment.

The clock frequency converter of the present invention shown in FIG. 1 comprises: an input terminal 11 for receiving an input time division multiplexed PCM signal *p*; an input clock pulse generator 12 for generating a clock pulse train *a* in synchronism with the bit frequency component of the PCM signal *p*; a delay means 13 consisting of five register stages 131 to 135 for sequentially storing each bit of the input PCM signal; a rotary switch 14 comprising fixed contacts 141 to 145 respectively connected to the five register stages and a movable contact 14M selectively connected to one of said fixed contacts; a switch 15 having a fixed contact 151 which directly receives from the movable contact 14M the output of the rotary switch 14, another fixed contact 152 which receives the output of the rotary switch 14 through a delay element 16 having the delay time approximately equal to a half-period of the input clock pulse, and a movable contact 15M selectively connected to one of the fixed contacts 151 and 152; a control pulse generator 22 for generating in response to a read-out clock pulse *b* from the input terminal 21 and the input clock pulse *a*, a control pulse train *d* for controlling a driving circuit 14D of the rotary switch 14 and said switch 15; an output AND-circuit 23; and an output terminal 24 for the output PCM signal *p'*.

The control pulse generator 22 is composed of: an AND-circuit 221 for receiving the input clock pulse *a* from the input clock pulse generator 12 and the output clock pulse *b* from the terminal 21; another AND-circuit 222 for receiving the input clock pulse *a* and a delayed output clock pulse *b'* through a delaying circuit 223 having the delay time approximately equal to a half-period of the output clock pulse *b*; and a flip-flop circuit 224 for receiving the output *c* of the AND-circuit 221 as a set input and the output *c'* of said AND-circuit 22 as reset-input. The control pulse *d* which is the output of the flip-flop circuit 224 is applied to the switch 15 and to the driving circuit 14D of the rotary switch 14. The output *b'* of the delay circuit 223 is applied to the AND-circuit 23, to which the output of said switch 15 is also applied.

The input clock pulse generator 12 is conventional; further, the delay means 13 is also well known in the art and may comprise a delay line and five intermediary terminals disposed thereon at a predetermined interval corresponding to the bit-period of the input PCM signal *p*. The delay time of the delay element 16 is not limited to a half-period of the input clock pulse *a;* however, as a practical matter, it should be shorter than the repetition period of the pulse $a$. Also, it will be apparent from the following description that the delay time of the delay circuit 223 may be chosen to be shorter than the repetition period of the pulse train $b$.

Continuing to refer to FIG. 1, and with reference to FIG. 2 (its abscissa indicates time $t$) the performance of the embodiment will be explained hereinafter.

For the convenience of illustration, it is assumed that the repetition frequency of the output clock pulse $b$ is slightly higher than that of the input clock pulse $a$ and that the movable contact 14M of the switch initially connected to the fixed contact 141 now stays at the fixed contact 144 subsequent to the stepwise motion described and illustrated herein.

In principle, the compensation of the difference of the repetition frequencies between the input and the output clock pulses may be achieved by way of stepwise driving the rotary switch in the direction of the fixed contact 145 every time the write-in of the input PCM signal (performed at the input clock pulse frequency) becomes lagging with respect to the read-out of the output PCM signal (performed at output clock pulse frequency). When the rotary switch 14 is stepwise driven, however, the leading or trailing edge of the code pulse signal might be read out causing an error in the input PCM signal. This error is avoided in the present invention as described below.

When the input clock pulse $a$ supplied from the input clock pulse generator circuit 12 and the output clock pulse $b$ supplied from the terminal 21 become in phase at the control pulse generator 22, the AND-circuit 221 generates the AND-output $c$. Since the AND-output $c$ sets the flip-flop circuit 224 to generate the control pulse $d$, the movable contact 15M is moved to the side of the fixed contact 152. On the other hand, the rotary switch driving circuit 14D does not respond to the control pulse $d$ which corresponds to the AND-output $c$.

Under this situation, the input PCM signal $p$ supplied from the input terminal 11 is applied to the AND-circuit 23 as one of its inputs through the movable contact 15M, because it is read out from the register stage 134 through the fixed contact 144 and the movable contact 14M, and then is applied to the fixed contact 152 of the switch 15 after being subjected to delay corersponding to a half-period of the clock pulse $a$ by means of the delay circuit 16.

At a predetermined time, after the input clock pulse $a$ and the output clock pulse $b$ have become in phase, the input clock pulse $a$ and the delayed clock pulse $b'$ become in phase, with the result that the AND-circuit 222 generates the AND-output $c'$. Since the AND-output $c'$ resets the flip-flop circuit 224, the moveable contact 15M of the switch 15 is caused to be connected to the fixed contact 151 by the control pulse $d$· Simultaneously, the rotary switch driving circuit 14D drives stepwise the movable contact 14M in the direction of the fixed contact 145, in response to the control pulse $a$ which corresponds to the AND-output $c'$. In other words, the read-out of the input PCM signal is one bit in advance of the read-out which was carried out when the movable contact 14M was connected to the fixed contact 144.

Thus, the switch 15 is driven every time the input clock pulse $a$ is in phase with either an output clock pulses $b$ or a delayed output clock pulse $b'$, whereas the rotary switch 14 is driven in a stepwise manner only when input clock pulse $a$ and delayed clock pulse $b'$ are in phase.

When the input clock pulse $a$ and the delayed output clock pulse $b'$ become again in phase, the movable contact 14M of the rotary switch 14 is reset from the fixed contact 145 to the other fixed contact 141 during the period corresponding to five time slots of the clock pulse. Since the technique necessary for this reset operation is well known, a more-detailed explanation will be omitted. Also, since the reception of the input signal is not performed during the period of the above-mentioned five time slots, the period may be allotted to the frame synchronization signal and the like.

The rotary switch 14 and the switch 15 are repeatedly operated in the above-mentioned manner. These operations are shown in FIGS. 2$s$ and 2$t$ in connection with the clock pulses $a$, $b$ and $b'$, and the AND-outputs $c$ and $c'$. Similarly, the input PCM pulse train $p$ and the output PCM pulse train $p'$ and the output PCM pulse train $p'$ are shown on the same time scale in FIGS. 2$p$ and 2$p'$.

As mentioned above, as long as the read-out is performed at the central portion of the clock period of the input PCM signal $p$, namely at the central portion of time domain defined by the clock pulse $a$, the input PCM signal is directly read-out, while when read-out must be performed at the edge of the time domain, the input signal is read-out not directly but through the delay circuit 16, which has the delay time approximately equal to a half of clock period. Therefore, possibility of the erroneous operation caused by the stepwise operation of the rotary switch 14 is eliminated.

Although the present invention has been described with reference to only one embodiment, it will be apparent that many modifications of this embodiment may be derived. For instance, the delaying means 13 may be replaced by a shift-register, in case the input clock frequency is low. Also, the clock pulse generator 12 may be dispensed with, when the clock pulse is separately transmitted by a transmission channel different from the one allotted to the signal $p$ or when the same is supplied from a main station installed in common to the range communication network. Moreover, an electronic switching circuit, such as a ring counter and an appropriate drive circuit, which does not contain any mechanical parts, may replace rotary switch 14. The same applies to the switch 15. The control pulse generator circuit 22 is not restricted to the above-mentioned example. Any circuits capable of generating the control pulse in response to the input signal may be substituted for the circuit 22. Furthermore, in contrast to the case of the embodiment where the repetition frequency of the output clock pulse $b$ is higher than that of the input clock pulse $a$, the relation of the frequencies may be inverse. In this case, however, it is necessary that the stepwise motion of the rotary switch 14 is reversed with respect to the above-mentioned case and that the extraneous bits have to be preliminarily inserted into the input PCM signal $p$.

While the principles of the invention have been described in connection with the above specific apparatus, it is to be clearly understood that this description is made only by way of example and not as a limitation to the scope of the invention.

What is claimed is:

1. A system for converting the clock frequencies between two time division multiplexed communication systems having two different clock frequencies, said system comprising first delay means having a plurality of states, each having separate output terminals;

means to apply an input pulse signal to said first delay means;

selecting means coupled to said first delay means to derive output signal from said output terminals, said selecting means including drive means to step the selecting means to a successive output terminal;

an input clock pulse means having the repetition frequency of the input pulse signal;

an output clock pulse means for read-out at a different frequency;

means to compare the phase difference between input and output clock pulses and to cause said drive means to stop when said phase difference exceeds a predetermined value, whereby the difference of the repetition frequencies may be effectively cancelled by the stepping of the selecting means when said difference exceeds an allowable range, second delay means and a direct circuit path coupled to the selecting means through which the derived output signals will pass, said second delay means having a delay approximately between a half-period but less than the whole repetition period of the input clock pulse; and switch means to selectively couple said second delay means or said direct circuit path to said selecting means;

said comparison means controlling said switch means.

2. The system of claim 1 in which said selecting means includes stepping means to select the next successive output terminal of said delay means.

3. The system of claim 1 in which said phase comparison means includes:

means to delay the output clock pulse *b* to provide a delayed output clock pulse *b'*;

means to compare the phase of input clock and said delayed output pulse *b'* and to step said selection means when said pulses are in phase.

4. The system of claim 3 in which said phase comparison means include means to compare the phase of (1) input clock pulse *a*, and (2) both of said output clock pulse *b* and said delayed output clock pulse *b'* and to drive said switch means when said pulses, *a* and *b* or *b'*, are in phase.

5. A clock frequency converter for combining two pulse communication systems having different clock frequencies with each other comprising a first delay means having a plurality of delay elements arranged so as to provide an input information pulse signal of first clock frequency with a time delay corresponding to an integral multiple of its clock period, an input terminal, and a plurality of output terminals;

a first selection means selectively connected to one of said output terminals for reading out said input information pulse signal;

an input clock pulse source for generating an input clock pulse of the repetition frequency equal to said first clock frequency;

an output clock pulse source for generating an output clock pulse of the repetition frequency equal to a second clock frequency;

a second delay means for giving a time delay shorter than the period of said input clock pulse to the output of said first selection means;

a second selection means for selectively deriving either one of the outputs of said first selection means and said second delay means;

means to compare the phase difference between said input and output clock pulses and to generate control pulses for driving said first and second selection means so as to reduce phase difference between said input clock pulse and said output clock pulse; and output means for generating the output information pulse signal in response to said output clock pulse and the output of said second selection means.

6. The invention of claim 5 in which said comparing means includes circuit means to provide a first or second signal, first input means to said circuit means responding to the presence of signals from said input and output clock pulse sources, second input means to said circuit means including third delay means coupled to said output clock pulse source, said second input means being responsive to signals from said first input clock pulse source and to the output from said third delay means representing delayed output clock pulses whereby said circuit means provide first or second signals depending upon the response of said first and second input means.

References Cited

UNITED STATES PATENTS

| | | | |
|---|---|---|---|
| 3,042,751 | 7/1962 | Graham | 179—15 |
| 3,227,811 | 1/1966 | Hart et al. | 179—15 |

RALPH D. BLAKESLEE, Primary Examiner

ALBERT B. KIMBALL, Jr., Assistant Examiner

U.S. Cl. X.R.

307—269; 328—63